Aug. 9, 1932.　　　　G. RAMSEY　　　　1,870,464
LIGHT METER AND VIEW SCOPE FOR CAMERAS
Filed Sept. 14, 1927　　4 Sheets-Sheet 2
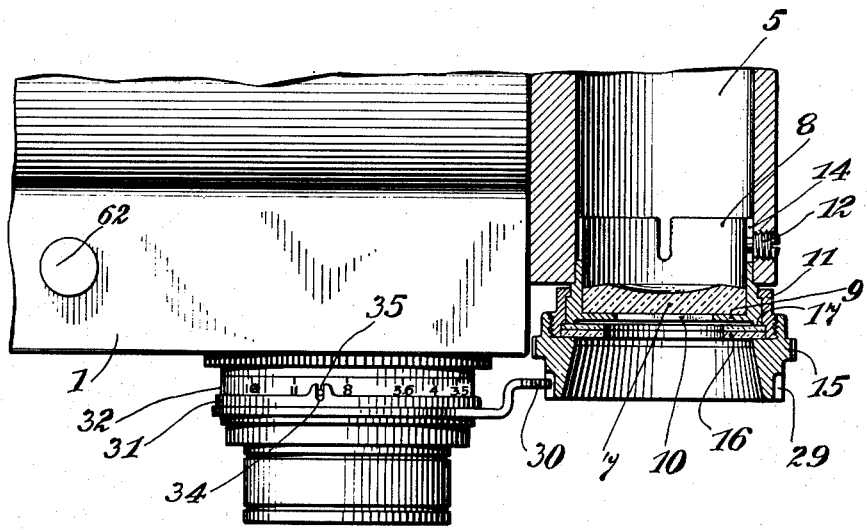
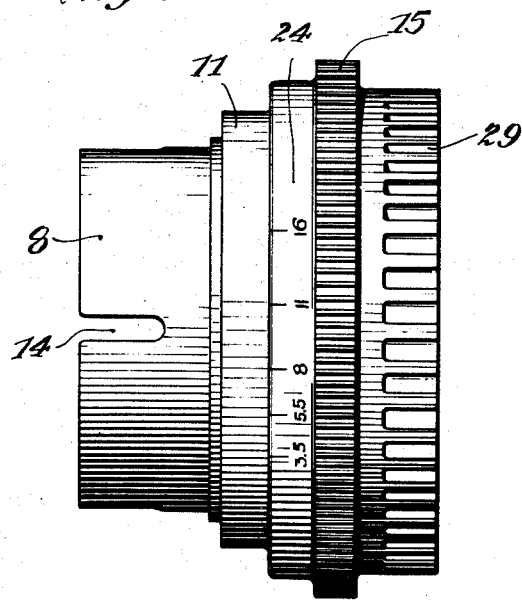
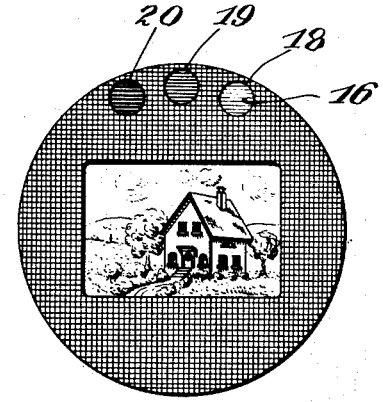
George Ramsey
INVENTOR Aug. 9, 1932.　　　　G. RAMSEY　　　　1,870,464
LIGHT METER AND VIEW SCOPE FOR CAMERAS
Filed Sept. 14, 1927　　　4 Sheets-Sheet 3

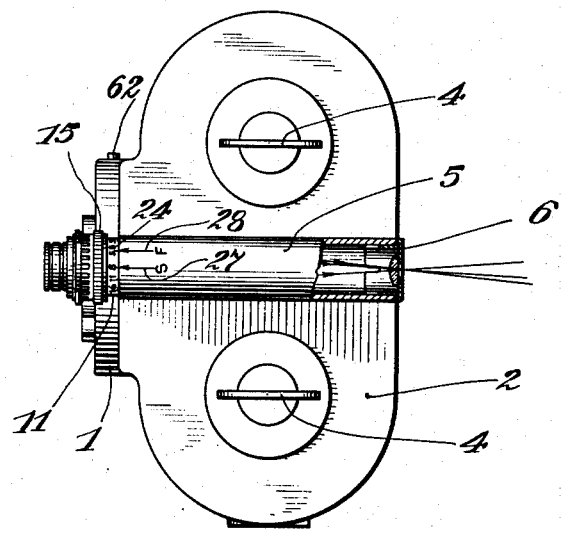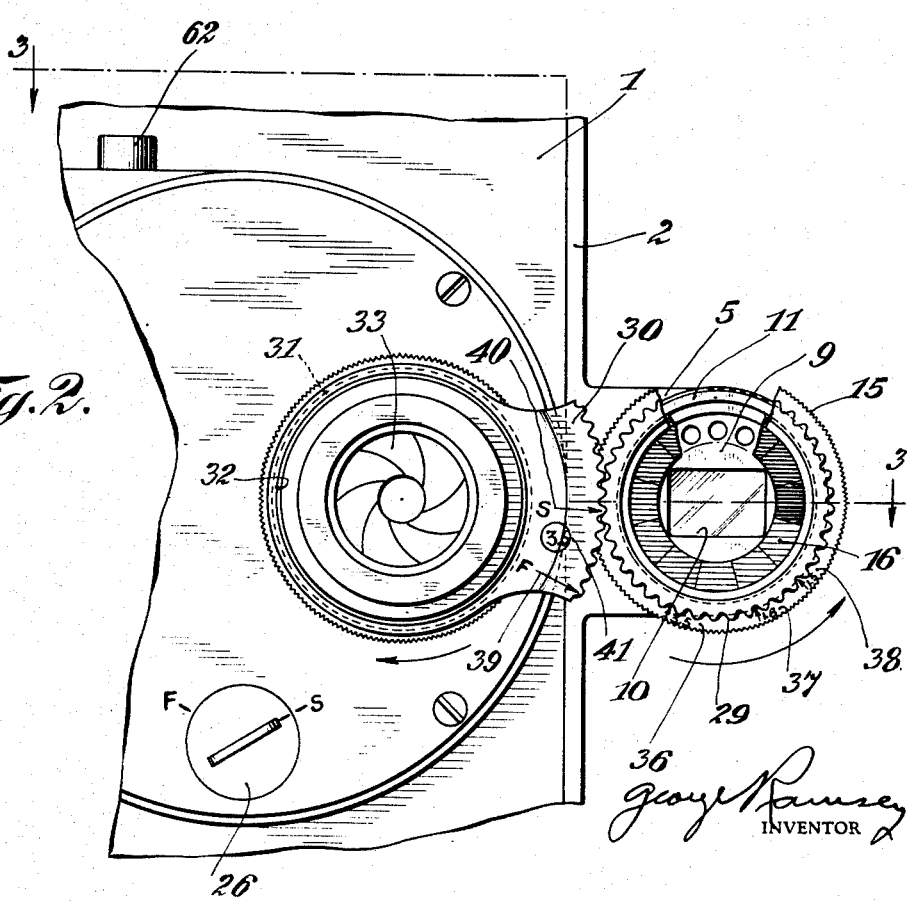

George Ramsey
INVENTOR

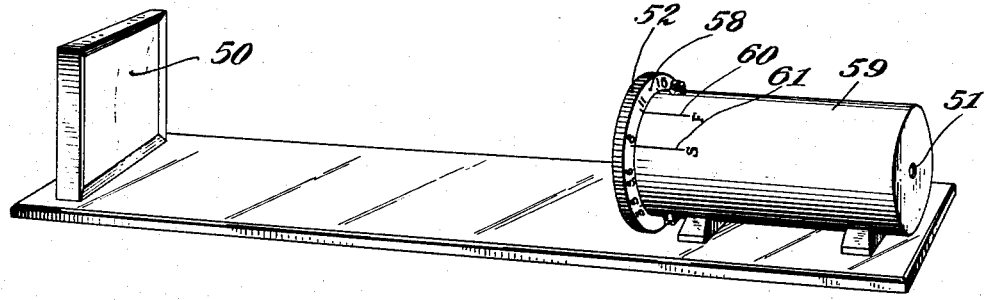
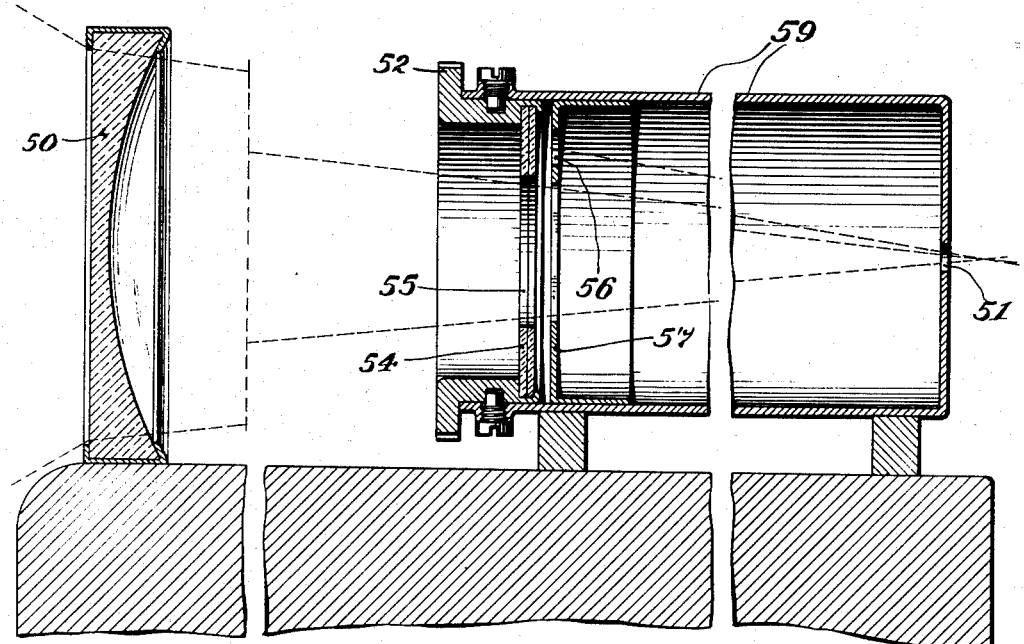

Patented Aug. 9, 1932

1,870,464

UNITED STATES PATENT OFFICE

GEORGE RAMSEY, OF BROOKLYN, NEW YORK

LIGHT METER AND VIEW SCOPE FOR CAMERAS

Application filed September 14, 1927. Serial No. 219,400.

The present invention relates broadly to optics and more especially to a light meter for cameras.

This invention is designed for use more especially with amateur portable moving picture cameras, although it may also be used with still picture cameras. The amateur moving picture camera is used under light conditions which vary greatly and the operator is compelled to judge the diaphragm opening which should be used for the particular light condition existing at the time of taking the picture. The intensity of the light is dfficult to determine without the use of instruments and since moving picture cameras are most frequently used in connection with moving objects, the time allowed for making calculations and adjustments is relatively short for each particular shot of the camera. This results in a waste of film by under or over exposure and the loss of pictures of action which may never occur again.

The present invention comprises a combined light meter and view scope whereby the operator may view the scene being photographed and at the same time determine without serious loss of time the correct diaphragm opening to properly expose the films. The invention also contemplates the combination of a light meter with the diaphragm operating mechanism of the lens, so that when the light meter is adjusted to correctly determine the intensity of the light, the diaphragm opening of the lens is automatically positioned with the correct opening for the light of the particular scene while the scene is being photographed.

A further object of the present invention is a light meter associated with a view finder and adapted to the diaphragm opening of the lens in such manner as to compensate for various predetermined speeds at which the moving picture camera is being operated.

Other and further features and attributes of the invention will in part be obvious and will in part be pointed out hereinafter in the specification following by reference to the accompanying drawings forming a part of the present application.

It is realized that the present invention may be embodied in structures other than those specifically disclosed herewith and therefore the disclosure is to be considered as illustrative and not in the limiting sense.

Fig. 1 is a side elevational view of one type of camera equipped with the present invention.

Fig. 2 is a view illustrating a portion of the front of the camera shown in Fig. 1, looking directly into the lens and into the light meter and view scope.

Fig. 3 is a view taken on line 3—3 of Fig. 2.

Fig. 4 is an enlarged plan view of the removable objective lens for the finder and carrying a portion of the light meter.

Fig. 5 illustrates a view as seen through the finder comprising the scene and the openings comprising a part of the light meter.

Fig. 10 is a further modified form of the invention.

Fig. 11 illustrates in section the modification shown in Fig. 10.

Figure 8:
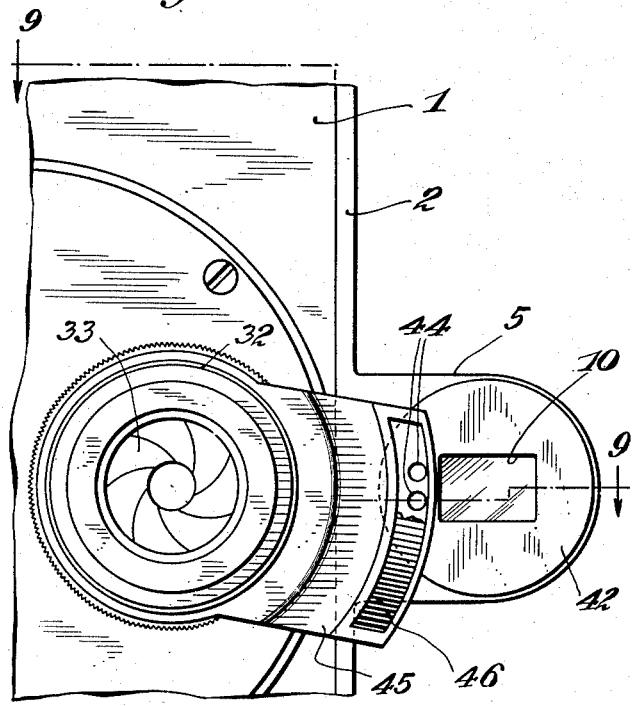
Fig. 8 illustrates a modification of the present invention.

The moving picture camera with which the form of the invention, as illustrated in Figs. 1 to 9 inclusive is associated, is known in the art as the Filmo moving picture camera and is disclosed in United States patent to Howell No. 1,620,726, March 15, 1927.

The Filmo camera is spring motor driven and is controlled by an operating button. Since it is well known in the art, details of camera construction which are identical with the details disclosed in the said United States patent, have not been illustrated herewith.

Referring now to the drawings and more especially to Figs. 1, 2, and 3, the camera case comprises a main portion 1 which carries a removable side plate 2 adapted to be locked in position on the main portion 1 by turning the locking handles 4. This side plate 2 is removable to insert film cartridges into the camera and for cleaning and inspection. A tubular member 5 is formed integrally on the side plate 2 and carries a removable eye piece lens 6 on one end and a removable objective lens 7 on the other. These lenses comprise a view-scope and in practice, are ground in such manner that the angle of vision therethrough corresponds to the angle of field of the camera lens so that the operator when looking through the view-scope sees exactly the field covered by the lens of the camera. In view of the fact that the camera lens is adapted to be removed and replaced by some lens of a different field, the view-scope lenses are also made removable from the tubular member 5 so that the view-scope lens may be inserted to match the field of the camera lens.

Referring now more especially to Fig. 3, which illustrates a preferred form of the invention, the objective lens 7 is mounted in a lens mount 8 which is provided with a partition 9 having a view opening 10 which frames or defines the limits of the view to be seen through the view scope. A rotatable sleeve 11 is mounted upon the lens mount 8, which mount is held against rotation in the tubular member 5 by means of a guide screw 12 that enters a slot 14 in the lens mount 8. A knurled thumb piece 15 is screw threaded to the rotatable sleeve 11 to clamp an annular screen 16 against a shoulder 17 on the sleeve 11. When the thumb piece 15 is rotated, the sleeve 11 rotates about the lens mount 8 and carries with it the screen 16. The partition 9 is also provided with light meter openings 18, 19, and 20. (The screen 16 is shown in Fig. 2 as broken away to more clearly show the light meter openings.) The edge of the lens 7 is preferably ground to direct light from the openings 18, 19, and 20 to the lens 6. These openings 18, 19, and 20 may be located at any position relative to the view opening 10 so long as the light meter openings are visible to the operator when looking through the eye piece lens 6. The annular screen 16 covers the light meter openings but does not cover the view opening.

Figure 6:
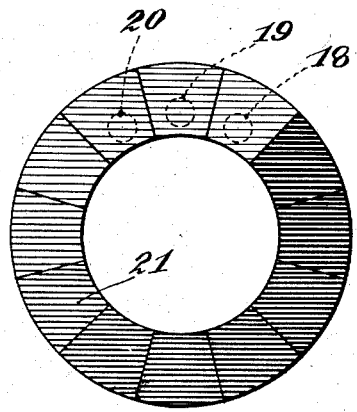
Fig. 6 is a view illustrating one type of screen for use with the light meter.
Figure 7:
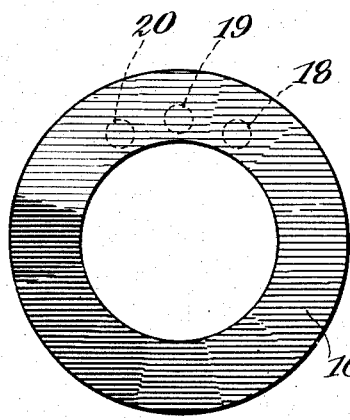
Fig. 7 illustrates another type of screen for use with the light meter.

The preferred screens 16 are shown in Figs. 6 and 7, and comprise a ring of graduated density to the transmission of light. It may be in sections 21 as illustrated in Fig. 6, or it may be made of graduated density to light transmission, as illustrated in Fig. 7. This screen 16 is so constructed that the lighter portions or sections interfere but little with the passage of light through the screen, and gradually blend into darker portions which substantially screen the passage of light. Where sections 21 are used, the density of a section is substantially uniform, and the sections are spaced relatively to the light meter openings (shown in dotted lines in Fig. 6) so that each opening is covered by a different section. Either the partition 9 or the screen 16 may be movable, but in the preferred form, the screen is movable. By moving this screen over the openings 18, 19, and 20, and beginning with the lighter portion of the screen, the operator will normally note a considerable passage of light through the three openings with the opening over the light portion of the screen appearing the brightest to the operator. As the screen is moved over the openings, the brilliancy of the openings will gradually decrease until the opening 20 is no longer visible, the opening 19 may be seen dimly and the opening 18 may be seen clearly defined, as illustrated in Fig. 5. The movement is now stopped, as this condition is a predetermined limit to determine light intensity. In a strong light, the above condition will be reached only when the screen is turned to the denser portions thereof, whereas in a dim light, the above condition will be reached when a less dense portion of the screen covers the openings. The operator may rotate the thumb piece 15 while viewing the scene to be photographed and thereby rotate the screen 16 of the light meter to obtain a measure of the strength of the light. By means of this observation the strength of the light effective for photographic purposes may be determined, and therefore a rotative part, (for example, the rotative sleeve 11,) may carry a scale 24 corresponding to the markings on the diaphragm opening control member of the lens. When the light strength is determined, the operator may then read the scale 24 with reference to a stationary index and set the camera lens diaphragm opening according to the reading whereby correct exposure will be obtained.

Moving picture cameras are ordinarily provided with mechanism to regulate the speed of the taking of the pictures and the Filmo camera, as illustrated in the said United States patent, is provided with a speed adjustment 26 whereby the film speed past the lens may be regulated from fast to slow or vice versa; the fast speed adjustment being indicated as shown in Fig. 2 by F and the slow speed position of the adjustment being illustrated by S. The speed of a film past the lens opening correspondingly changes the speed of the shutter and therefore it is desirable for the operator to be able to determine light values with reference to shutter speed. Consequently the tubular member 5 may be provided with two arrows 27 and 28, one of which is designated by the letter S and the other of which is designated by the letter F. These arrows are the stationary indices with which the scale 24 is to be read. After determining the light value, the operator then reads the scale 24 with reference to either the arrow 27 or 28 depending upon the setting of the speed adjustment 26. Having determined the light value, the scale 24 then reads directly as to the necessary setting of the opening for the diaphragm of the lens for correctly photographing the particular scene viewed by the operator through the view-scope.

In view of the relationship between the light meter and the proper opening of the diaphragm, the present invention also comprises providing mechanism whereby when the light meter is set to ascertain the light values, the diaphragm opening is automatically set for a correct exposure at a predetermined speed of the shutter. To this end, the thumb piece 15 may be provided with an extension, the outer end of which is formed with gear teeth 29, and a gear segment 30 may be provided with a sleeve 31 which fits over the collar 32 of the lens mount that controls the opening in the iris diaphragm 33. The sleeve 31 is adapted to set over the collar 32 by a friction fit and if desired may be provided with a slot 34 that fits down over a pin 35 carried by the collar 32. Where it is desired to unscrew the camera lens without removing the removable side plate 2 from the camera case to disengage segment 30 from the gear 29, the sleeve 31 may be slipped upwardly sufficiently to disengage the gear segment 30 from the ends of the gear teeth 29, so that the camera lens may be unscrewed. The face of the thumb piece 15 is provided with numbered teeth 36, 37 and 38, marked 3.5, 1.8 and 1.5, and the gear segment 30 is provided with indicating arrows 39 and 40 marked F and S. The segment also carries a designation 41 indicating the speed of the lens, for example, "3.5". Where the camera is set to run at slow speed, and a 3.5 lens is used, the tooth S designated by arrow 40 is placed in engagement with the numbered tooth 36, indicated as "3.5". This brings the properly shaded portion of the screen 16 into relation with the gear segment 30 so that at slow speed, the indication of the correct light values through the light meter will bring about the correct diaphragm setting. If the camera is set to operate at fast speed, then the tooth F designated by arrow 39 is brought into engagement with the tooth on the thumb piece 15 designated "3.5". This brings about the proper relation between the diaphragm opening, the graduated light screen 16 and the fast shutter speed.

From the foregoing, it will be observed that with the proper gear setting, when the operator views the scene being photographed and rotates the thumb piece 15 until the light values are determined, the diaphragm opening is automatically opened or closed, dependent upon which way the thumb piece 5 is rotated, to the proper size. When the side plate 2 is removed to load the camera, the operator in replacing the side piece in position observes that the proper teeth on the gear 29 are associated with proper teeth on the gear segment 30. If a change is to be made in the relation of the gear teeth by changing the speed of the camera or otherwise, the gear segment 30 may be disengaged from the teeth 29 by raising the sleeve 31 on the collar 32 to disengage the segment from the gear. Where faster lenses are substituted for example, a lens of F—1.8 or F—1.5, in place of the F—3.5, a corresponding tooth 37 or 38 as the case may be is brought into engagement with the marked teeth on the gear segments mounted on the faster lenses. The teeth 29 are made sufficiently long so that the lens may be moved toward or away from the focal plane in the camera for focusing and the segment 30 may slide endwise in the gear teeth 29.

Figure 9:
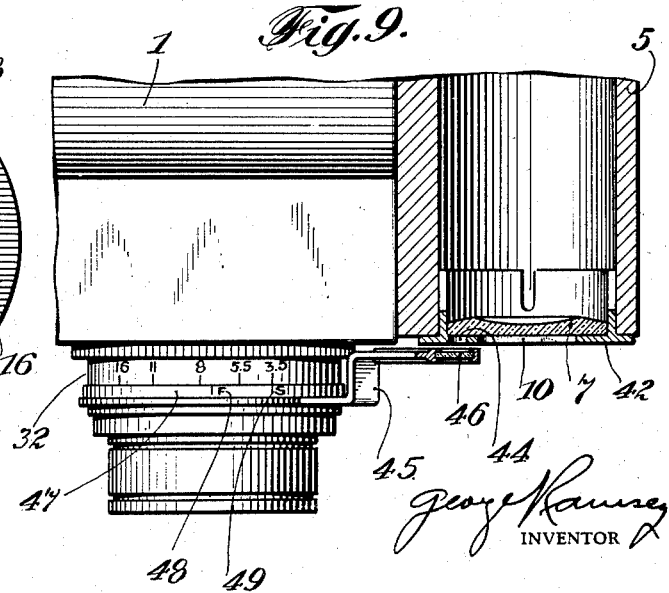
Fig. 9 is a view taken on line 9—9 of Fig. 8.

Figs. 8 and 9 illustrate a modification of the device for use with the Filmo camera, in which modification, the lens mount 42 for the objective lens 7 of the view-scope is provided with openings 44 at the side of the lens mount, and an arm 45 mounted on the collar 32 of the lens carries segment screen 46 of graduated transparency which is arranged to swing over the opening 44 in the lens mount. This segment is shown in Fig. 8 as partly broken away to more clearly show the openings 44. This graduated segment screen likewise is retained on the collar 32 of the lens mount by means of a friction sleeve 47, which sleeve bears designations F and S, indicated at 48 and 49. Where the camera is set to run at slow speed, the designation S is set opposite the indication "3.5" on the collar 32, when the diaphragm is full open; and where the camera is set to run at fast speed, the designation F as at 48 is set opposite to the designating number "3.5" on the collar 32 when the diaphragm is full open. In the use of this form of the invention, the operator views the scene and moves the segment arm 45 until the light value is determined and thereby automatically sets the diaphragm while viewing the scene to be photographed.

Figs. 10 and 11 illustrate a further modification of the present invention in which the device is adapted for use with the peep-sight type of finder or view-scope comprising an objective lens 50 and a peep opening 51. In this form of device, a rotating member 52 carries a light value screen 54 which is provided with a clear opening 55 through which the objective lens 50 may be seen through the peep opening. The graduated light value screen 54 covers openings 56 in the partition member 57 so that the rotatable member 52 may be rotated to determine the light values. The rotatable member 52 is provided with a scale 58 indicating diaphragm settings and the supporting tube 59 carries designating arows 60 and 61 representing the speed F and S at which the camera is intended to operate so that when the operator has set the light meter to determine the value of a predetermined light condition, the scale 58 may be read from either of the designating arrows in accordance with the speed at which the camera is set to operate. The operator then sets the diaphragm of the lens in the usual way in accordance with the indications determined.

The present invention enables the operator to view the scene to be photographed and at the same time predetermine light conditions from light reflected into the finder scope from the scene being photographed. Where the scene being photographed varies in light values, as where the operator is taking a vertical panorama of a dark valley and sunlit mountain tops, the diaphragm opening may be changed while holding down the operating button 62, thereby correctly exposing the film without stopping the camera without interrupting the view through the viewscope.

Having thus described my invention, what I claim is:

1. A light meter and view-scope for variable speed moving picture cameras comprising a view-scope objective; a light meter comprising a screen, a partition having a light meter opening exposing a portion of said screen, a single eye piece for viewing said view-scope objective and said light meter opening, movable means for causing a relative movement between said screen and said opening, a diaphragm scale upon said movable means, and a plurality of speed indicating indices associated with said scale whereby said scale may be read in accordance with a plurality of speeds at which the moving picture camera is to be operated.

2. A light meter for cameras comprising a stationary partition provided with a series of openings, a light screen of graduated density movable over said openings whereby the amount of light passing through one of said openings is different from the amount passing through others of said openings, an objective viewscope lens to form the image of the object being photographed, and an eye piece for viewing said image and all of said openings simultaneously.

3. A light meter for cameras comprising a light tight tube, a partition provided with a plurality of openings and mounted on the objective end of said tube, an annular screen of graduated density to light mounted to rotate over said openings whereby the degree of light intensity may be measured by observing the degree of visibility of all of said openings, a viewscope objective lens viewable through the opening in said screen, and an eye piece for viewing said openings and said objective lens.

4. A light meter for cameras comprising means to support a partition, a partition mounted in said means, said partition being provided with a single viewscope aperture and with a plurality of light meter openings, an annular screen comprising sections of varying density to light, said sections being spaced relative to said openings in such manner that each opening is covered by a different section whereby the degree of light intensity is determined by observing the relative visibility of all of said openings, and viewscope means operable by light passing through said aperture.

5. An article of manufacture, a mounting, an unobstructed viewscope lens mounted in said mounting, a partition mounted in said mounting and provided with an aperture for said lens and a plurality of light meter openings adjacent to said aperture, and light screens of varying light density movable over said light meter openings to permit the intensity of light to be measured without changing the light passing through said lens.

6. A light meter and view scope for moving picture cameras to measure the light intensity and simultaneously show the limits of the camera lens field, comprising a view scope objective, a light meter member, adjustment means to vary the light intensity of the light meter member, a single eye piece to simultaneously view the field through the view scope objective and the comparative light intensity of the light meter member.

7. A light meter and view scope for moving picture cameras to measure the light intensity and simultaneously show the limits of the camera lens field comprising a view scope objective, a light meter member, adjustment means to vary the light intensity of the light meter member, and a single eye piece receiving light from the light meter member and the full light from the view scope objective while the adjustment means to vary the light intensity of the light meter member is being operated.

8. A light meter and a view scope for moving picture cameras comprising a view scope objective, a light meter member, adjustment means to vary the light intensity of the said member for reading purposes, a single eye piece covering the light meter member and the full open view scope objective while the light meter is being adjusted, a camera lens, a diaphragm for the camera lens, and connecting means between the light meter and the diaphragm to set the diaphragm by adjusting the light meter while viewing the full open objective through the single eye piece.

9. A combined view scope and light meter for cameras to simultaneously view the limits of the camera lens field in full light intensity and a reading of a light meter to indicate the light intensity of said field; comprising a view scope field limit member; a light meter; and an eye piece to simultaneously view the readings of the light meter and the said field in full light intensity for all readings of the light meter and for all settings of the camera lens.

GEORGE RAMSEY.